(12) United States Patent
Biggel et al.

(10) Patent No.: US 11,690,349 B2
(45) Date of Patent: Jul. 4, 2023

(54) SYSTEM AND KIT FOR PROCESSING A FLOWABLE FOOD MASS (71) Applicant: Hochland SE, Heimenkirch (DE)

(72) Inventors: Andreas Biggel, Hergatz (DE); Maria Jacob, Heimenkirch (DE); Wolfgang Tipolt, Heimenkirch (DE); Franz Stadelmann, Opfenbach (DE); Markus Fuhge, Opfenbach (DE)

(73) Assignee: Hochland SE, Heimenkirch (DE)

( * ) Notice: Subject to any disclaimer, the term of this patent is extended or adjusted under 35 U.S.C. 154(b) by 803 days.

(21) Appl. No.: 16/124,694

(22) Filed: Sep. 7, 2018

(65) Prior Publication Data
US 2019/0000032 A1 Jan. 3, 2019

Related U.S. Application Data (62) Division of application No. 14/375,707, filed as application No. PCT/EP2013/052022 on Feb. 1, 2013, now Pat. No. 10,085,412.

(30) Foreign Application Priority Data

Feb. 1, 2012 (DE) .......................... 102012001832.0

(51) Int. Cl.
*A01J 25/12* (2006.01)
*B65H 16/02* (2006.01)
(Continued)

(52) U.S. Cl.
CPC ............. *A01J 25/12* (2013.01); *A01J 25/002* (2013.01); *A23C 19/08* (2013.01); *B65H 16/021* (2013.01);
(Continued)

(58) Field of Classification Search
CPC .......... A01J 25/002; A01J 25/12; A01J 25/00; A01J 25/007; A01J 25/008; A23C 19/08;
(Continued)

(56) References Cited

U.S. PATENT DOCUMENTS 3,479,024 A   11/1969   Miller et al.
3,887,719 A    6/1975   Miller
(Continued)

FOREIGN PATENT DOCUMENTS

EP   0 472 943 A2   3/1992
JP   H05304888 A   11/1993
JP   2003039382 A    2/2003

*Primary Examiner* — Erik Kashnikow
*Assistant Examiner* — Bryan Kim
(74) *Attorney, Agent, or Firm* — Lelkes IP; Robert Lelkes (57) ABSTRACT A system for processing a flowable food mass is disclosed which includes a first cooling belt (11) having a face with a transport direction (T); a second cooling belt (12) having a face with a transport direct (T) adjacent to, and parallel with, the face of the first cooling belt (11), wherein the transport direction (T) of the face of the second cooling belt (11) is the same as the transport direction (T) of the face of the first cooling belt; and a film roller arrangement (15) for disposing a plurality of strip-shaped carrier film webs onto the first cooling belt (11), wherein each strip-shaped carrier film web has a pair of parallel edges and the strip-shaped carrier film webs are disposed adjacent to each other without gaps and partially overlap each other at their respective parallel edges to form a carrier film arrangement and a kit of parts for assembling the system.

11 Claims, 6 Drawing Sheets (51) Int. Cl.
*A01J 25/00* (2006.01)
*A23C 19/08* (2006.01)

(52) U.S. Cl.
CPC .. *B65H 2301/4148* (2013.01); *B65H 2701/19* (2013.01)

(58) Field of Classification Search
CPC .............. A23C 19/0684; B65H 16/021; B65H 2301/4148; B65H 2701/19; B65H 16/08; B29C 31/02; B29C 31/04; B29C 31/044; B29C 31/08; B29C 31/085; B29C 2043/5875; B65B 25/001; B65B 25/005; B65B 25/006; B65B 25/007; B65B 41/16
See application file for complete search history.

(56) References Cited

U.S. PATENT DOCUMENTS

| | | | |
|---|---|---|---|
| 3,890,886 A | 6/1975 | Fessler et al. | |
| 3,900,574 A | 8/1975 | Warwick | |
| 4,735,817 A * | 4/1988 | Smith | A23C 19/0908 99/464 |
| 5,573,805 A | 11/1996 | Fager et al. | |
| 5,601,855 A | 2/1997 | Fager et al. | |
| 6,500,475 B1 | 12/2002 | Kraklow et al. | |
| 8,235,372 B2 * | 8/2012 | Boucher | B65H 23/32 270/41 |
| 8,464,975 B2 * | 6/2013 | Bartesaghi | B65H 16/04 242/615.12 |
| 2003/0209027 A1 | 11/2003 | Owens et al. | |
| 2007/0098861 A1 * | 5/2007 | Biggel | A01J 25/12 426/512 |
| 2007/0131809 A1 * | 6/2007 | Kawashita | B65H 23/025 242/159 |
| 2010/0201065 A1 * | 8/2010 | Dawley | B41F 13/58 271/278 |
| 2010/0330233 A1 * | 12/2010 | Reyes | A23C 19/084 426/582 |
| 2011/0226102 A1 * | 9/2011 | Biggel | A01J 27/04 83/23 |
| 2012/0308679 A1 | 12/2012 | Biggel et al. | |
| 2013/0122169 A1 | 5/2013 | Biggel et al. | |

* cited by examiner

SYSTEM AND KIT FOR PROCESSING A FLOWABLE FOOD MASS

CROSS-REFERENCE TO RELATED APPLICATIONS

This is a divisional of U.S. patent application Ser. No. 14/375,707 having a § 371 date of Jul. 30, 2014, which is the national phase of international application no. PCT/EP2013/052022 filed on Feb. 1, 2013 under 35 USC § 371, which claims priority under the Paris Convention based on German patent application no. 10 2012 001 832.0 filed on Feb. 1, 2012.

FIELD OF THE INVENTION

The invention relates to a method and a device for processing a flowable food mass.

BACKGROUND OF THE INVENTION

A method and a corresponding device for shaping and cooling a flowable food mass, in particular hot melted cheese, is known from DE 103 28 905, for example. Therein, the food mass is shaped into a product band by means of two cooling belts guided by shaping rollers and is cooled during further transport. Shaping the hot product into a wide band having an adjustable and homogeneous thickness is a technical challenge in particular, since the melted cheese must first have a temperature of over 80° C. in order to be formable. Within the scope of further processing, cooling must be carried out rapidly and, primarily, homogeneously, without the product band becoming deformed. After cooling, the product band is initially cut into strips, which are placed on top of one another, and are cut, via transverse cutting, into stacks of cheese slices lying on top of one another. The finished stacks are packaged "slice-on-slice".

This type of production makes it possible to produce cheese slices in mass quantities and to package these cheese slices in relatively large bundles. This type of packaging is only suitable, however, for types of cheese in which the consistency of the slices is such that they have a certain tearing resistance and can be easily lifted off of one another even in the stacked state. Types of cheese having a particularly creamy and soft consistency are suitable for production in this manner only in certain ways and, primarily, being stacked on top of one another in slices without placement of a separating sheet therebetween.

The use of a separating film in such a method is described in the subsequently published document DE 10 2011 103 826. Therein, a method for shaping and cooling initially hot and therefore flowable melted cheese is described, which is applied onto a moving metallic cooling belt via a supply nozzle. In this case, a shaping roller acting upon the cooling belt is used to shape individual shaped bodies, in particular finished shaped slices, from the melted cheese, to release these shaped bodies from the molding cavities of the shaping roller and leave these on the moving cooling belt to cool. A carrier film that holds the shaped bodies together is required in order to process these individual shaped bodies. At the end of the cooling process, the film is cut and can be used as intermediate film during stacking.

In this method, the separating sheets are therefore already provided during the shaping of the food mass and are cut, along with the product lying thereon, into corresponding slices. A separating film between the cheese band and a conveyor belt is also disclosed in U.S. Pat. No. 4,7435,817.

It has proven to be difficult, however, to cut a cheese band, which is lying on a film, together with the film into exact strips without the product being changed thereby.

The problem addressed by the invention is therefore that of improving the known method for processing flowable food masses such that a particularly soft and creamy food product can also be brought into slice form, in mass quantities, and stacked to form stacks of slices.

The problem addressed by the invention is solved by the method and the device according to the present invention.

SUMMARY OF THE INVENTION

One aspect of this invention is a method for processing a flowable food mass (1), in particular hot melted cheese, which is introduced, via a supply nozzle (2), into a gap (3) between two vertically disposed shaping rollers covered by cooling belts (11, 12), which are metallic, in particular, wherein the food mass (1) is shaped into a product band (10) having a defined thickness, wherein a carrier film arrangement (21) is provided between the first cooling belt (11) and the product band (10), wherein the product band (10) is moved, in order to be cooled, together with the carrier film arrangement (21) in the transport direction (T) and is fed to a longitudinal cutting device, wherein the carrier film arrangement (21) comprises a plurality of carrier film webs (23), which are disposed next to one another without gaps in the transport direction (T) and, in particular, partially overlap one another, the product band (10) extends seamlessly over the plurality of carrier film webs (23), which are disposed next to one another, and the product band (10) is cut by cutting means (8) of the longitudinal cutting device, in particular by cutting rollers, on the carrier film webs (23) into product strips (13) extending parallel to the transport direction (T).

Another aspect of this invention is a device, in particular for implementing the method according to any one of the preceding claims, comprising:
two vertically disposed cooling belts, which are metallic in particular, which circulate endlessly around a shaping roller disposed at the top and a guide roller disposed at the bottom,
a supply nozzle for introducing the flowable food mass into the gap formed by the shaping rollers covered by the cooling belts (11, 12),
a film roller arrangement for introducing a carrier film arrangement (21) between the first cooling belt (11) and the shaped product band (10),
means for moving and cooling the product band (10) lying on the carrier film arrangement (21),
further comprising cutting means (8) for cutting the product band (10) into food strips (13) extending parallel to the transport direction (T),
wherein the film roll arrangement provides a carrier film arrangement (21), which comprises a plurality of carrier film webs (23), which are disposed next to one another in gaps and, in particular, partially overlap, wherein the cutting means (6) are oriented such that the cutting paths (14) produced extend along the longitudinal edges of the carrier film webs (23).

BRIEF DESCRIPTION OF THE DRAWINGS

The invention is explained in greater detail in the following with reference to the figures. Therein

DETAILED DESCRIPTION OF THE INVENTION

The gist of the invention is the use of a carrier film arrangement having a plurality of carrier film webs, which are disposed next to one another without separation ("without gaps") in the transport direction and, in particular, which partially overlap one another. This carrier film arrangement forms a sealing support onto which the flowable product is applied, shaped to form a product band, and cooled. At the end of cooling, it is merely necessary to cut the product band lengthwise into product strips without the film underlayer and separate the product strips from one another by means of the individual carrier film webs.

The invention therefore relates to a method for processing a flowable food mass, wherein the food mass is introduced, via a supply nozzle, into a gap between two moving, vertically disposed cooling belts, which are metallic, in particular, and are shaped into a food band or product band having a defined thickness. The carrier film arrangement is provided between the first cooling belt and the product band, wherein the product band is moved together with the carrier film arrangement in a transport direction. The method is characterized, in particular, in that the carrier film arrangement comprises a plurality of carrier film webs, which are disposed next to one another without gaps in the transport direction and, in particular, partially overlap one another, wherein the product band extends seamlessly over the plurality of carrier film webs, which are disposed next to one another. The product band is cut on the carrier film webs into product strips extending parallel to the transport direction by cutting means, in particular by cutting rollers.

The product band is cut, exclusively, into strips by means of the cutting means of the longitudinal cutting device, while the carrier film webs remain intact. The defined thickness of the food band can be specified and adjusted in a defined manner by the distance between two shaping and redirection rollers in the region of the filling nozzle, wherein one of the cooling belts is guided by the rollers in each case.

In this manner a relatively wide product band can be prepared on a carrier film arrangement and initially cooled by means of the cooling belts. The initially wide product band can then be cut, in a very simple manner, into strips having virtually any strip width and fed to further processing. The advantage is that the product strips that are produced continue to remain on the carrier film web associated with the strip. The carrier film web can therefore be used not only as a "vehicle" for the uncut product band in the region of the cooling belts, but is also a carrier for the product for subsequent processing strips as well. This method permits products to be processed virtually independently of the consistency thereof. Particularly creamy and soft melted cheese can be processed, in particular.

Given that the carrier film arrangement already comprises a plurality of individual carrier film webs, which are disposed next to one another without gaps, the longitudinal cutting of the films together with the food band is omitted. Such a cutting step can therefore be omitted, thereby significantly simplifying the processing method. The cut food strips can then be separated from one another simply by moving the individual carrier strip bands apart from one another. The cutting means for the longitudinal cutting can be very easily dimensioned, since these only need to cut through the mostly soft food band, but not the carrier film webs, which are relatively viscous and robust, because these are tension-resistant. In summary, the method according to the invention makes it possible to use the carrier film for shaping and cooling as a separating sheet as well, wherein, unlike the food mass, the carrier film need not be subjected to longitudinal cutting.

The expression "disposed next to one another without gaps" is intended to mean an arrangement of the carrier film webs in which food mass is prevented from passing between the carrier film webs, which are disposed next to one another, even if a very small gap were present, as considered exactly. A carrier roll web can have a width of approximately 50 to 150, in particular approximately 100 mm, for example, wherein the widths of corresponding processed cheese slices have a similar dimension.

The product strips are preferably ultimately separated from one another by the carrier film webs moving apart from one another and can be fed to further processing. In particular, the product strips can be cut into individual slices by transverse cutting and these product strips can be stacked on top of one another in stacks.

It is very particularly preferred, however, for adjacent carrier film webs to overlap transversely to the transport direction. It can thereby be ensured that an underlying region of a carrier film web is not wetted with the food product. After separation, a corresponding overhang of carrier film web remains, which is free of food mass. In particular when the carrier film web is subsequently also used as a separating sheet in the stacking of a plurality of food slices, a type of food-free grip remains, with the aid of which the individual slices can be grasped. An underlying region of a carrier film web refers to a region of a carrier film web that does not come into contact with the food band, since the overlapping part of the adjacent carrier film web is disposed between this region and the food band. In contrast thereto, an overlying region refers to a section of a carrier film web that can come into contact with the food band, since this region is not covered by the overlapping section of the adjacent carrier film web. Instead, the overlying region can, in turn, cover an underlying region of the adjacent carrier film web. The overhang can be, preferably, at least 4 mm or maximum 20 mm, wherein the overhang can be based entirely on the dimensions of the grip for the separating sheet.

Preferably, the cutting paths between two adjacent food strips, which are created in the food band by the cutting means, are aligned flush with a respective overlying longitudinal edge of a carrier film web. In contrast thereto, an underlying longitudinal edge of a carrier film web does not need to be aligned with a cutting edge. By aligning the overlying longitudinal edge with the cutting edge, a flush termination between the food strip and the carrier film web is obtained without longitudinally cutting both the food band and the carrier film web.

Preferably, parts of the carrier film web remain, as a separating sheet, in contact with the food product that is produced, in particular a cheese slice, and are packaged together with the slice. Further cutting operations, in particular transverse cutting, can follow the method according to the invention. In one embodiment, the product strips (13) are transversely cut, wherein at least one part of the carrier film web (23) remains, as a separating sheet (8), in contact with the produced product slice (4) and is packaged together therewith.

Preferably, at least one auxiliary film is disposed, at least in sections, between a first cooling belt and the food belt, wherein the auxiliary film moves together with the food band in the transport direction. The auxiliary film is intended, in particular, to prevent the food band from adhering to the second cooling belt. Different films having different adhesion values are used in order to ensure, in particular, good removal of the preferably very soft or creamy food product from the auxiliary film. The films are selected, in particular, such that a first adhesion value between the carrier film web and the food band is greater than a second adhesion value between the auxiliary film and the food band. The adhesion values can be set by means of the material selection or the selection of the surface texture of the films.

The auxiliary film preferably wraps around the second cooling belt, wherein the second auxiliary film is fixedly connected to the second cooling belt at a transverse edge located upstream in the transport direction, for example being bonded thereto. The length of the auxiliary film is greater than the circumference of the second cooling belt. In order to apply the auxiliary film, this auxiliary film is initially fixed on the second cooling belt via the transverse edge located at the front, preferably being bonded thereto. The second cooling belt is then moved in the transport direction, whereby the auxiliary film wraps around the second cooling belt until this cooling belt is finally wrapped around completely. Since the auxiliary film is longer than the circumference of the second cooling belt, the second cooling belt is wrapped around at least once without a gap. A very simple method for applying and replacing such an auxiliary film on a cooling belt is hereby provided. The auxiliary film can therefore be pulled behind the cooling belt like a train and will thereby orient itself on the cooling belt. A type of floating support on the cooling belt results, in particular, when adhesion between the cooling belt and the auxiliary film is very slight. Folds can be prevented from forming in the auxiliary film or can at least straighten themselves out. The auxiliary film can remain on the second cooling belt for a certain period of time, in particular a few days, and can then be replaced by a new auxiliary film.

It is furthermore preferable for a separating means, in particular an oil, such as soybean oil or lecithin oil, for example, to be applied between the food band and the auxiliary film. The auxiliary film preferably has a width, which is at least as wide, in particular wider, than the sum of the carrier films, possibly minus the overhangs, and can have a width that is 3- to 5-fold the width of the carrier film, for example, possibly minus the sum of the overhangs, i.e. approximately 450 mm, for example. The auxiliary film is preferably provided with a layer on the side facing the food band that repels food, in particular cheese. The carrier film webs preferably do not have such a layer. The auxiliary film is preferably separated from the food band before the food band is cut into food strips. The cutting is then preferably carried out without the auxiliary film. The use of the auxiliary film is not necessarily coupled to the embodiment of the above-described carrier film arrangement comprising a plurality of carrier film webs disposed next to one another. Instead, this use combined with the features of the preamble of claim 1 can also be a separate invention.

The adhesion between the carrier film web and the cooling belt can be increased by means of corona treatment on the surface of the carrier film web that is in contact with the cooling belt. Polypropylene, for example, is suitable as the material for the carrier film webs and for the auxiliary film.

In order to improve the alignment of the auxiliary film on the second metallic cooling belt, a separating means, in particular a separating oil, is preferably introduced between the second cooling belt and the auxiliary film. This enables the auxiliary film to become better aligned, automatically, on the second cooling belt. As a result, the homogeneity of the surface of the food product covered by the auxiliary film can be improved, since tensions between the auxiliary film and the food band are better compensated by means of the floatability of the auxiliary film on the second cooling belt. Folds are prevented from forming in the second auxiliary film. This applies in particular for auxiliary films that wrap around the second cooling belt in an annular manner.

The invention further relates to a device for processing a flowable food mass, in particular a spreadable cheese or processed cheese, which can implement a method according to the aforementioned claims. In such a device, in particular, the food product is processed to form a food band having a defined thickness. The device comprises the following units. At least two vertically disposed cooling belts, which are metallic, in particular, a supply nozzle for introducing the food product in a flowable state into a gap, which is formed between the two cooling belts. A carrier film arrangement is provided between the first cooling belt and the food band, wherein the food band can be moved together with the carrier film arrangement in a transport direction. Furthermore, cutting means are provided for cutting the food band on the carrier film arrangement into food strips extending parallel to the transport direction.

According to the invention, the carrier film arrangement comprises a plurality of carrier film webs, which are disposed next to one another and, in particular, partially overlap one another. The cutting means are oriented such that cut edges between two adjacent product strips, which are produced by the cutting means, are aligned with longitudinal edges of the overlying carrier film webs. Reference is made to the advantages mentioned above with respect to the method, and to further potential embodiments.

The device preferably comprises guide means, in particular guide rollers, by means of which the carrier film webs, which are disposed next to one another, can be separated from one another. The guide means are disposed downstream of the cutting means in the transport direction. In other words, the food band is first cut into food strips, and then the carrier film web is separated from one another by the guide means.

Types of cheese that are very creamy and/or sticky are those, in particular, that have one or more of the following parameters:

The hardness (the maximum force during the first deformation) is less than 500 g, in particular less than 300 g, in particular approximately 244 g. For comparison: conventional types of processed cheese can have a hardness of approximately 1146 g.

The adhesiveness (the work required to overcome adhesion forces between the processed cheese and the contact surface) is less than −180 g*sec, in particular less than −180 g*sec, in particular approximately −184 g*sec. For comparison: conventional types of processed cheese can have an adhesiveness of approximately −154 g*sec.

The springiness (the extent to which a deformed cheese sample returns to the original state before the deformation) is approximately 0.92, which approximately corresponds to the springiness of conventional types of processed cheese.

The cohesiveness (minimal force during the first deformation of a cheese sample) is approximately 0.74, which approximately corresponds to the springiness of conventional types of processed cheese.

The gumminess (energy required to dissolve a cheese sample and bring this into a swallowable state) is less than 400 g, in particular less than 200 g, in particular approximately 181 g. For comparison: conventional types of processed cheese can have a gumminess of approximately 842 g.

The chewiness (energy required to chew a cheese sample) is less than 400 g, in particular less than 200 g, in particular approximately 167 g. For comparison: conventional types of processed cheese can have a gumminess of approximately 784 g.

Figure 1:
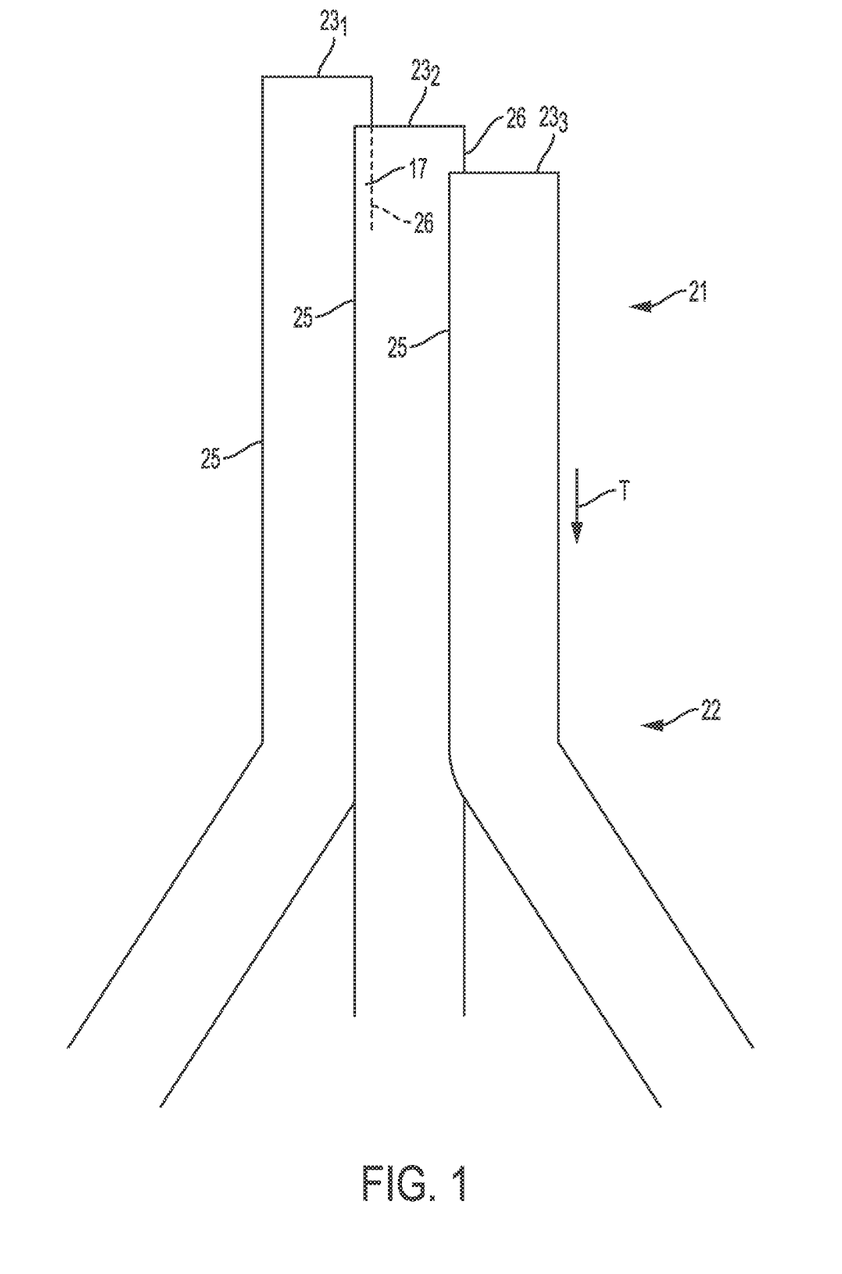
FIG. 1 shows a schematic depiction of the unwinding of a carrier film arrangement without a food mass during implementation of the method according to the invention.

FIG. 1 shows the unwinding of a carrier film arrangement 21 during the method according to the invention. In the present example, the carrier film arrangement 21 comprises three carrier film webs $23_1$, $23_2$, $23_3$, which are disposed next to one another without gaps. Two carrier film webs 23 disposed next to one another overlap in each case by an overhang 17 and lie on top of one another in the region of the overhang 17. An overlying longitudinal edge 25 of the second carrier film web $23_2$ overlaps the first carrier film web $23_1$ and subsequently comes into contact with the food band. An underlying longitudinal edge of the second carrier film web $23_2$, which faces the third carrier film web $23_3$, is covered by the third carrier film web $23_3$ and therefore does not come into contact with the food band 10. The carrier film webs 23 are shown only in sections. In an upper region, which is not shown, film rolls 16 of a film roll arrangement 15 adjoin one another, from each of which one of the carrier film webs 23 is unwound in order to implement the method. The carrier film webs 23 are then unwound in the transport direction T and reach a redirection region C (FIG. 2), in which transfer rollers or the like are provided and with the aid of which the carrier film webs 23 can be separated from one another. As an alternative, the carrier film webs disposed next to one another can also be fed to a common transverse cutting device. The individual carrier film webs 23 are placed on a non-illustrated, first cooling belt, as explained in greater detail further below.

Figure 2:
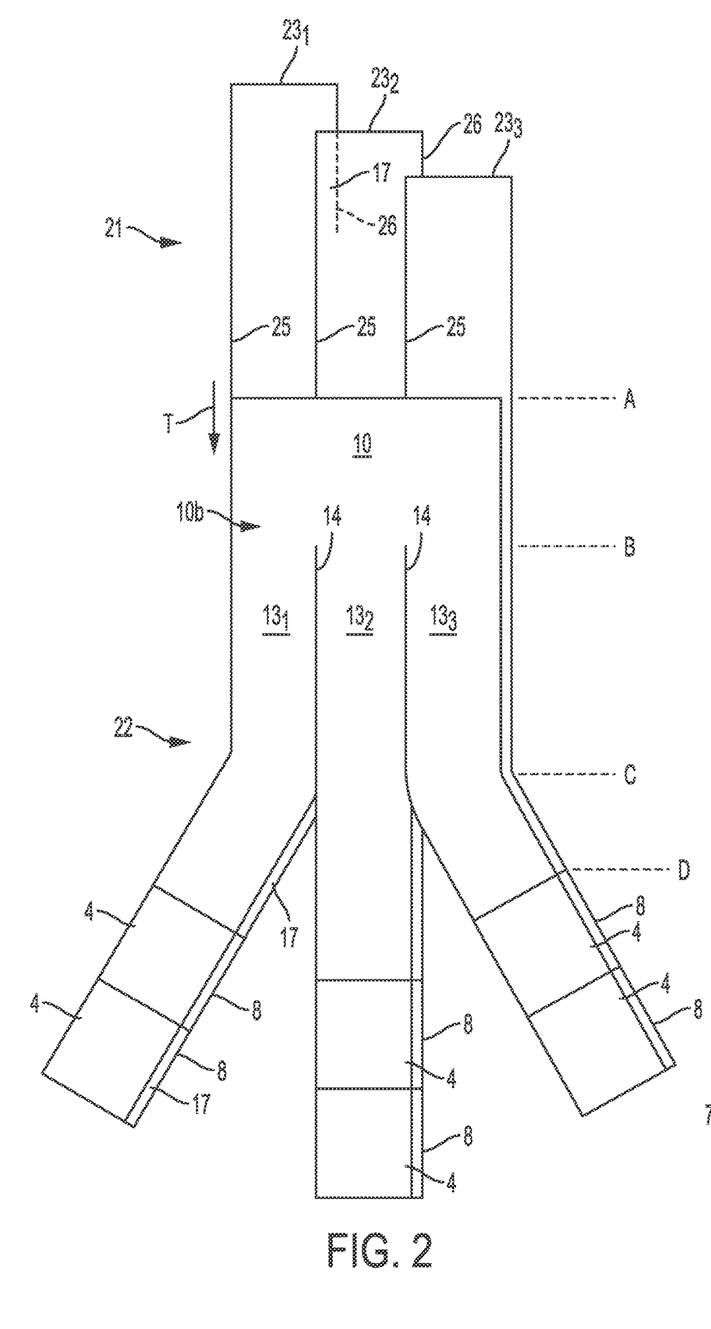
FIG. 2 shows a schematic depiction of the unwinding of the carrier film arrangement according to FIG. 1 with a food mass applied thereon.

FIG. 2 shows the carrier film arrangement 21 from FIG. 1, wherein food mass in the form of processed cheese is now placed on the carrier film arrangement 21. Initially, in section A, the processed cheese forms a processed cheese band 10, which is applied in liquid form or at least semifluid form onto the carrier film web 23. The processed cheese band 10 extends seamlessly over the three carrier film webs 23 and is moved together with the carrier film webs 23 in the transport direction T.

Figure 3:
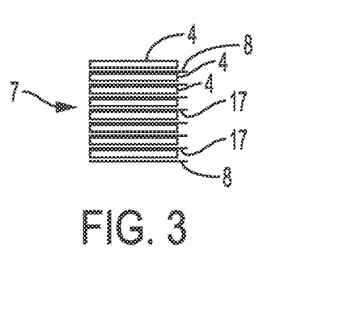
FIG. 3 shows the food slices with separating sheet, which have been processed and stacked.

Cutting rollers 6 (FIG. 6) take effect in region B and cut the processed cheese band 10 into individual processed cheese strips $13_1$, $13_2$, $13_3$. The cutting rollers 6 create cutting paths 14, which are exactly aligned with the overlying longitudinal edges 25 of the carrier film webs 23. It is possible to provide automatic film edge detection, in particular with an optical sensor, which detects the position of the overlying longitudinal edges 25 of the film web. The cutting means 6 only cut the processed cheese band 10, however, and not the carrier film webs 23. Redirection rollers 22 (FIG. 6) are provided in region C, by means of which the carrier film webs 23 are separated from one another. In the present case, the first and the third carrier film webs $23_1$ and $23_3$ are moved outwardly, while the second carrier film web $23_2$ is further conveyed, in a straight line, in the center. The separation can take place in other directions as well. Furthermore, the separation of adjacent bands can take place after a transverse cutting procedure. It is evident that the carrier film webs 23 are still in contact with the processed cheese strips 13 lying on top thereof. It is further evident that the overhang 17 produced by the overlapping arrangement of the carrier film webs 23 is now exposed after the separation and forms a section that is free of processed cheese and is suitable for use as a grip. Transverse cutting of the processed cheese strips 13 into processed cheese slices 4 is implemented in region D. The processed cheese slices 4 can then be stacked on top of one another, as shown in FIG. 3. The parts of the carrier film web 23 remain, as a separating sheet 8, between the processed cheese slices 4 stacked on top of one another. It is evident that the overhang 17 projects slightly beyond the stack 7 of processed cheese slices 4 and thereby provides a way to grip individual slices. The size of the grip on the separating sheets 8 can be defined via the selection of the size of the overhang 17.

Figure 4:
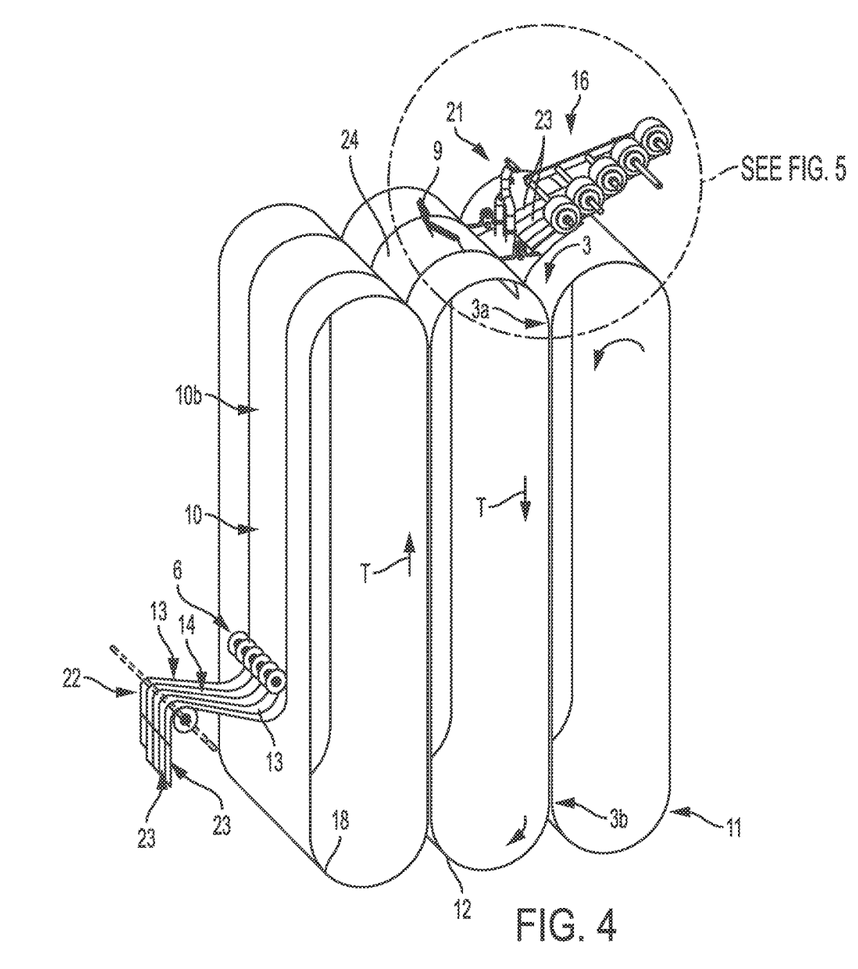
FIG. 4 shows a device according to the invention, in a perspective view.
Figure 5:
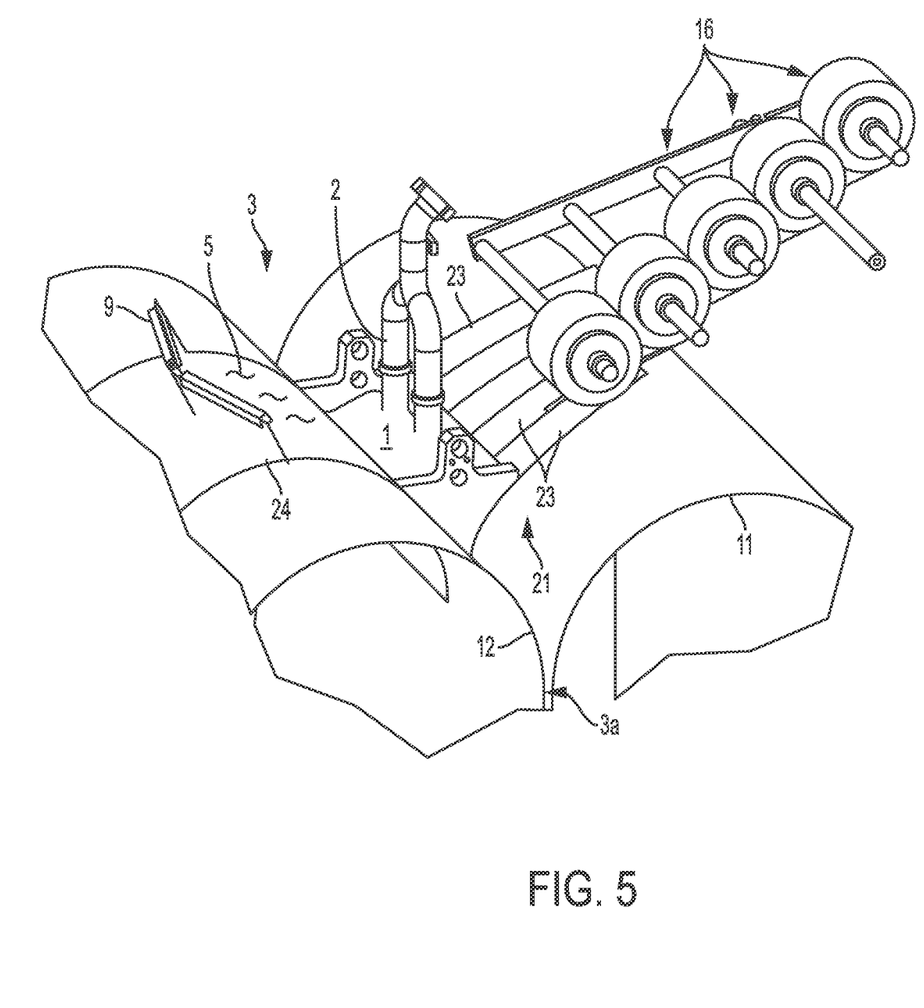
FIG. 5 shows a detail of the device according to FIG. 4 in the region of the supply nozzle, in a perspective view.
Figure 6:
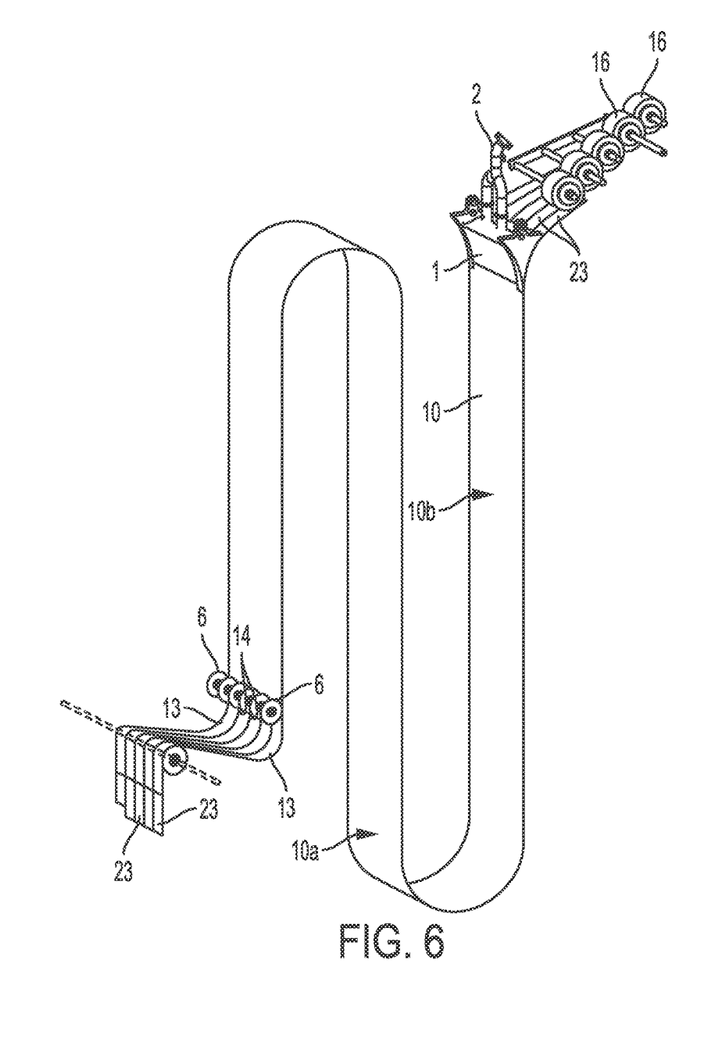
FIG. 6 shows the device according to FIG. 4 without cooling belts and partially without carrier film webs, in a perspective view.

FIGS. 4 to 6 will be described jointly in the following. These figures show the device for implementing the claimed method, on which the carrier film arrangement 21 according to FIGS. 1 and 2 is used. A few of the components of the device are not shown in FIG. 6, and therefore the course of the processed cheese band 10 is largely shown. The device comprises a first metallic cooling belt 11, a second metallic cooling belt 12, and a third metallic cooling belt 18, and therebetween the processed cheese band 10 from a supply nozzle 2 to the cutting rollers 6. In the region of the supply nozzle 2, hot melted cheese 1 is introduced into a gap 3 provided between the first metallic cooling belt 11 and the second metallic cooling belt 12. The thickness of the processed cheese band 10 that is produced is adjusted by means of the distance between the cooling belts. The distance between the cooling belts can be specified in a defined manner by non-illustrated return rollers at the upper and lower regions of the cooling belts. The first metallic cooling belt 11 is partially covered by a carrier film arrangement 21, which is largely disposed in entirety between the processed cheese band 10 and the first metallic cooling belt 11. A plurality of film rolls 16 disposed upstream of the supply nozzle provide the individual carrier film webs 23, which form the carrier film arrangement 21. As viewed in the transport direction T, the film rolls 16 are disposed one behind the other with roll axes extending transversely to the transport direction T, but these film rolls overlap transversely to the transport direction T, and therefore the unwound carrier film webs 23 also overlap, as previously shown in FIGS. 1 and 2.

The carrier film webs 23 are now moved together with the metallic cooling belts 11, 12, in the transport direction T, carrying along viscous melted cheese 1, which is then processed to form the processed cheese band 10. The carrier film webs 23 remain in constant contact with the processed cheese band 10 and, together with the processed cheese band 10, thereby wrap around the second metallic cooling belt 12 and the third metallic cooling belt 18. In order to ensure that the processed cheese band 10 can become subsequently detached from the second metallic cooling belt 12, an auxiliary film 24 is disposed between the second metallic cooling belt 12 and the processed cheese band 10. The auxiliary film 24 has a relatively low adhesion value compared to the processed cheese band 10 and is therefore easy to remove from the processed cheese band 10. The carrier film webs 23 have a higher adhesion value than the auxiliary film 24 as compared to the processed cheese band 10, and therefore the processed cheese band 10 adheres better to the carrier film web 23 than to the auxiliary film 24. The auxiliary film 24 therefore detaches from the processed cheese band 10 in the upper redirection region of the third metallic cooling belt 18, while the processed cheese band 10 remains on the carrier film webs 23 and is conveyed in the direction of the cutting rollers 6. The auxiliary film 24 annularly encloses the second metallic cooling belt 12, and therefore the auxiliary film 24, together with the second metallic cooling belt 12, executes a common rotational movement. In contrast thereto, the carrier film webs 23 are designed as a type of endless film, which are unwound from a relatively large film roll and then, as the separating sheet, exit the arrangement together with the processed cheese.

The cutting rollers 6 cut cutting paths 11 into the processed cheese band 10, thereby producing individual processed cheese strips 13, as previously explained by reference to FIG. 2. In the present case, a total of five processed cheese strips are created, which are disposed parallel to one another and lie on five corresponding carrier film webs 23, which are disposed next to one another. The absolute number of processed cheese strips can vary, wherein it must be ensured, however, that the number of processed cheese strips that is cut is never fewer than the number of carrier film webs that are present. Exactly one carrier film web must be assigned to each processed cheese strip.

The redirection rollers 22 are disposed downstream of the cutting rollers 6. By means of the redirection rollers 22, the processed cheese strips 13 can be fed into different directions, thereby separating the processed cheese strips 13. The processed cheese strips 13 still lie on the carrier film webs 23 at this point. A stripper 9 is provided in the upper redirection region of the second metallic cooling belt 12, which ensures that the auxiliary film 23 is always flat upon arrival into the region of the supply nozzle 2.

In order to reduce the adhesion between the auxiliary film and the processed cheese band 10, a separating means 5, in particular a separating oil, is applied onto the auxiliary film 24, namely onto the side that comes into contact with the processed cheese band 10. The stripper 9 can further serve to remove excess separating oil or to evenly distribute the separating oil 5 on the auxiliary film 24. Furthermore, a separating means is applied onto the other side of the auxiliary film 24, namely the side that comes into contact with the second metallic cooling belt 12, wherein this separating means ensures automatic alignment of the auxiliary film 23 on the metallic cooling belt 12. It is therefore possible to prevent folds from forming in the auxiliary film 24.

Figure 7:
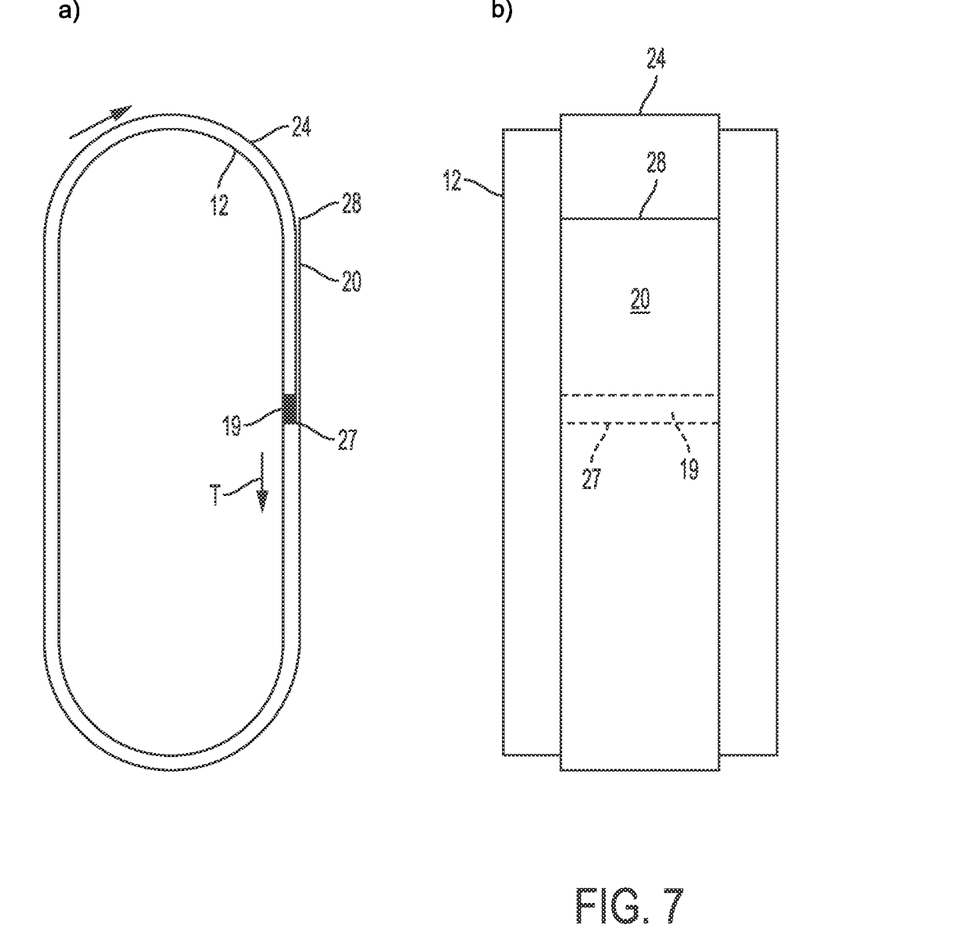
FIG. 7 shows the second cooling belt with the auxiliary film placed thereon
  a) in a side view,
  b) in a front view.

FIG. 7 illustrates the arrangement of the auxiliary film web 24 on the second metallic cooling belt 12. The auxiliary film web 24 is wound onto the second metallic cooling belt 12. A transverse edge 27 of the auxiliary film web 24 disposed at the front in the transport direction is fastened to the second metallic cooling belt by means of bonding 19. The bonding can be in the form of an adhesive strip. If the second metallic cooling belt 12 now moves in the transport direction, it pulls the auxiliary film web 24 behind itself in the manner of a train. Fixation of the transverse edge 28 located downstream of the transport direction T is therefore not required. The auxiliary film web 24 has a length in the longitudinal direction that is greater than the circumference of the second metallic cooling belt 12. An overhang 20 overlaps the bonding 19 and the transverse edge 27 of the auxiliary film web 24 located in the front in the transport direction T. The entire second metallic cooling belt 12 is therefore wrapped around at least once, without gaps, by the auxiliary film web 24.

The statements made with respect to the exemplary embodiment can also apply for other types of food, to the extent this is possible, and are not limited to processed cheese. Furthermore, the cooling belts do not necessarily need to be metallic.

| List of reference characters | |
|---|---|
| 1 | melted cheese |
| 2 | supply nozzle |
| 3 | gap |
| 3a | first end of gap (3) |
| 3b | second end of gap (3) |
| 4 | processed cheese slice |
| 5 | separating means |
| 6 | cutting rollers |
| 7 | stack of processed cheese slices |
| 8 | separating sheet |
| 9 | stripper |
| 10 | processed cheese band |
| 10a | first face of processed cheese band (10) |
| 10b | second face of processed cheese band (10) |
| 11 | first metallic cooling belt |
| 12 | second metallic cooling belt |
| 13 | processed cheese strip |
| 14 | longitudinal cutting path |
| 15 | film roller arrangement |
| 16 | film roller |
| 17 | carrier film web overhang |
| 18 | third metallic cooling belt |
| 19 | bonding |
| 20 | auxiliary film web overhang |
| 21 | carrier film arrangement |
| 22 | redirection roller |
| 23 | carrier film web |
| 24 | auxiliary film web |
| 25 | overlying longitudinal edge of carrier film web (23) |
| 26 | underlying longitudinal edge of carrier film web (23) |
| 27 | front transverse edge of auxiliary film web (24) |
| 28 | rear transverse edge of auxiliary film web (24) |
| T | transport direction |

We claim:

1. A system for processing a flowable food mass comprising:
   (a) A first cooling belt having a face with a transport direction in a downward direction;
   (b) a second cooling belt having a face with a transport direct adjacent to, and parallel with, the face of the first cooling belt, wherein the transport direction of the face of the second cooling belt is the same as the transport direction of the face of the first cooling belt, wherein the face of the first cooling belt and the face of the second cooling belt form a gap between the face of the first cooling belt and the face of the second cooling belt;
   (c) a film roller arrangement located above the first cooling belt, the film roller arrangement comprising a plurality of film rollers, wherein each film roller is rotationally mounted on the film roller arrangement, whereby each film roller has an axis of rotation about an axis having an axial direction, a width measured to the outer periphery of the film roller in the axial direction, and a diameter measured to the outer periphery of each film roller in a direction transverse to the axial direction, wherein the plurality of film rollers are arranged in a staggered configuration relative to each other such that each film roller is adjacent to at least one other film roller and at least one film roller is located between two adjacent film rollers, wherein
  (1) the axes of rotation of the film rollers are oriented (a) parallel to the face of the first cooling belt and (b) parallel to each other,
  (2) the axes of rotation of the film rollers are offset from each other in a direction transverse to the axes of rotation of the film rollers such that the axis of rotation of each film roller is offset from the axis of rotation of the next adjacent film roller by a distance in the direction transverse to the axes of rotation of the film rollers that is greater than the diameter of each film roller, and
  (3) the film rollers are offset from each other in a direction parallel to the axes of rotation of the film rollers such that each film roller is offset from the next adjacent film roller by a distance in the direction parallel to the axes of rotation of the film rollers that is less than the width of the next adjacent film roller and
(d) a plurality of strip-shaped carrier film webs distributed among, and mounted on, the plurality of film rollers such that each film roller is provided with one strip-shaped carrier web, wherein the film roller arrangement is configured to dispense said web films (1) between the flowable food mass and the first cooling belt and (2) such that said web films are disposed adjacent to each other without gaps and partially overlap each other at their respective parallel edges to form a film arrangement.

2. The system according to claim 1, wherein the film rollers are staggered sequentially transverse to the transport direction from a location proximal to the first cooling belt to a location distal from the first cooling belt.

3. The system according to claim 1, wherein the transport direction is substantially vertical.

4. The system according to claim 3 further comprising a supply nozzle located at a position above the gap capable of supplying the flowable food mass.

5. The system according to claim 4 further comprising cutting rollers for cutting a food product into strips disposed at a location downstream from the supply nozzle and the gap.

6. The system according to claim 5 further comprising a third cooling belt adjacent the second cooling belt for transporting and cooling the food product between the second cooling belt and the third cooling belt and the cutting rollers are located adjacent to the third cooling belt.

7. The system according to claim 2, wherein the transport direction is substantially vertical.

8. The system according to claim 7 further comprising a supply nozzle located at a position above the gap capable of supplying the flowable food mass.

9. The system according to claim 8 further comprising cutting rollers for cutting a food product into strips disposed at a location downstream from the supply nozzle and the gap.

10. The system according to claim 9 further comprising a third cooling belt adjacent the second cooling belt for transporting and cooling the food product between the second cooling belt and the third cooling belt and the cutting rollers are located adjacent to the third cooling belt.

11. The system according to claim 1, wherein the first cooling belt and the second cooling belt are each metallic.

* * * * *